US010947117B2

(12) United States Patent
Bose et al.

(10) Patent No.: US 10,947,117 B2
(45) Date of Patent: Mar. 16, 2021

(54) MECHANICALLY STABLE COMPOSITE ELECTROLYTE FOR INTERMEDIATE TEMPERATURE FUEL CELL WITH IMPROVED PROTON CONDUCTIVITY AND METHODS THEREOF

(71) Applicants: University of Houston System, Houston, TX (US); Anima B. Bose, Houston, TX (US); Wei Li, Houston, TX (US)

(72) Inventors: Anima B. Bose, Houston, TX (US); Wei Li, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 16/310,533

(22) PCT Filed: Jun. 27, 2017

(86) PCT No.: PCT/US2017/039549
§ 371 (c)(1),
(2) Date: Dec. 17, 2018

(87) PCT Pub. No.: WO2018/005530
PCT Pub. Date: Jan. 4, 2018

(65) Prior Publication Data
US 2019/0263661 A1   Aug. 29, 2019

Related U.S. Application Data

(60) Provisional application No. 62/355,028, filed on Jun. 27, 2016.

(51) Int. Cl.
*C01B 25/42* (2006.01)
*H01M 8/1016* (2016.01)
*C01G 19/00* (2006.01)
*C01G 19/02* (2006.01)

(52) U.S. Cl.
CPC .............. *C01B 25/42* (2013.01); *C01G 19/00* (2013.01); *C01G 19/02* (2013.01); *H01M 8/1016* (2013.01); *C01P 2002/50* (2013.01); *C01P 2002/52* (2013.01); *C01P 2002/72* (2013.01); *C01P 2004/03* (2013.01); *C01P 2004/04* (2013.01); *H01M 2300/0071* (2013.01)

(58) Field of Classification Search
CPC .......... C01B 25/42; C01G 19/00; Y02E 60/50
See application file for complete search history.

(56) References Cited

U.S. PATENT DOCUMENTS 3,462,314 A * 8/1969 Berger ................. C08J 5/22
                                                      264/666
4,687,715 A * 8/1987 Michael .............. H01M 8/0293
                                                      252/520.22

OTHER PUBLICATIONS

International Patent Application No. PCT/US2017/039549 International Search Report and Written Opinion dated Sep. 6, 2017 (12 pages).
Li et al., "An approach for restoring the proton conductivity of sintered tin pyrophosphate membranes for intermediate temperature fuel cells," Journal of Power Sources, vol. 307 (2016) pp. 146-151 (6 pages).
Anfimova et al., "Metal Phosphates as Proton Conducting Materials for Intermediate Temperature Fuel Cell and Electrolyser Applications," PhD Thesis, Technical University of Denmark, 2014 [retrieved on Aug. 7, 2017], retrieved from Internet: <URL: http://orbit.dtu.dk/files/99454521/Metal_Phosphates_as_Proton_Conducting_Materials.pdf>, pp. i, ix-xi, 34-44 and 97-101 (24 pages).
Shen et al., "Intermediate-temperature, non-humidified proton exchange membrane fuel cell with a highly proton-conducting Fe0.4Ta0.5P2O7 electrolyte," Electrochemistry Communications, vol. 24 (2012) pp. 82-84 (3 pages).
Heo et al., "Performance of an Intermediate-Temperature Fuel Cell Using a Proton-Conducting Sn0.9In0.1P2O7 Electrolyte," Journal of the Electrochemical Society, vol. 153, Issue 5 (2006) pp. A897-A901 (5 pages).
Nagao et al., "Proton Conduction in In3+-Doped SnP2O7 at Intermediate Temperatures," Journal of the Electrochemical Society, vol. 153, Issue 8 (2006) pp. A1604-A1609 (6 pages).
Chen et al., "An Oxide Ion and Proton Co-Ion Conducting Sn0.9In0.1P2O7 Electrolyte for Intermediate-Temperature Fuel Cells," Journal of the Electrochemical Society, vol. 155, Issue 12 (2008) pp. B1264-B1269 (7 pages).
Wu et al., "A Sb-doped SnP2O7 Solid Proton Conductor for Intermediate Temperature Fuel Cells," Fuel Cells, Wiley Interscience (2008) pp. 453-458 (6 pages).
Wang et al., "Electrical conduction in dense Mg2+-doped SnP2O7-SnO2 composite ceramic for intermediate temperature fuel cell," Journal of Power Sources, vol. 222 (2013) pp. 467-469 (3 pages).
Hibino et al., "Design of proton-conducting Sn0.95Al0.05P2O7 with a mesoporous structure," Journal of Materials Chemistry A, 1 (2013) pp. 13082-13088 (7 pages).
Scott et al., "Intermediate temperature proton-conducting membrane electrolytes for fuel cells," Advanced Review, WIREs Energy Environ (2013) DOI: 10.1002/wene.64, (18 pages).
Paschos et al., "A review on phosphate based, solid state, protonic conductors for intermediate temperature fuel cells," J. Phys.: Condens. Matter, 23 (2011) 234110 (26 pages).

(Continued)

*Primary Examiner* — Bradley R Spies
(74) *Attorney, Agent, or Firm* — Conley Rose, P.C.

(57) ABSTRACT

A method of restoring the proton conductivity of a sintered pyrophosphate membrane of intermediate temperature fuel cells (IT-FCs) by introducing phosphoric acid into the sintered $SnP_2O_7$ membrane to react with the degraded $SnP_2O_7$ species and thus restore the membrane pyrophosphate and proton conductivity. Such cells operate with low external humidification, and the active area of the cells may be fabricated up to 100 cm$^2$ in size.

7 Claims, 11 Drawing Sheets

(56) References Cited

OTHER PUBLICATIONS

Jin et al., "Proton conduction in metal pyrophosphates (MP2O7) at intermediate temperatures," Journal of Materials Chemistry, DOI: 10.1039/b924188d (2010) 20, pp. 6214-6217 (4 pages).
Xu et al., "Intermediate temperature stable proton conductors based upon SnP2O7, including additional H3PO4," Journal of Materials Chemistry, DOI: 10.1039/c0jm01089h (2010) pp. 7827-7833 (7 pages).
Gregorova et al., "Porosity and pore size control in starch consolidation casting of oxide ceramics—Achievements and problems," Journal of the European Ceramic Society, 27 (2007) pp. 669-672 (4 pages).
Tomita et al., "Intermediate-Temperature Proton Conduction in Al3+-Doped SnP2O7," Journal of the Electrochemical Society, vol. 154, Issue 12 (2007) pp. B1265-B1269 (5 pages).
Chai et al., "Mesoporous lanthanum phosphate nanostructures containing H3PO4 as superior electrolyte for PEM fuel cells," RSC Advances, 3 (2013) pp. 21928-21935 (8 pages).

* cited by examiner

MECHANICALLY STABLE COMPOSITE ELECTROLYTE FOR INTERMEDIATE TEMPERATURE FUEL CELL WITH IMPROVED PROTON CONDUCTIVITY AND METHODS THEREOF

CROSS-REFERENCE TO RELATED APPLICATIONS

This application is a National Phase Entry of, and claims priority to PCT Application No. PCT/US2017/039549, filed Jun. 27, 2017, which claims priority to U.S. Provisional Application Ser. No. 62/355,028, filed Jun. 27, 2016, the entire contents of each hereby incorporated by reference herein for all purposes.

STATEMENT REGARDING FEDERALLY SPONSORED RESEARCH OR DEVELOPMENT

Not applicable

BACKGROUND

Field of the Disclosure

This disclosure generally relates to a method of producing low-cost, highly proton conductive, highly selective, and mechanically strong pyrophosphate based electrolyte membranes for proton conducting Intermediate Temperature Fuel Cells (IT-FCs); this disclosure further relates to methods of restoring proton conductivity of pyrophosphate membranes through sintering approach; and in some embodiments the disclosure may provide a methodology for commercial fabrication of proton exchange intermediate temperature fuel cells.

Background of the Technology

Intermediate temperature fuel cells disclosed herein, which operate at temperatures of 200-300° C. have attracted great interest for fuel cell development because of high impurity tolerance, high fuel flexibility, facile reaction kinetics, and low-cost construction materials. Recently, it has been found that low-cost pyrophosphates of tetravalent elements ($MP_2O_7$ with M=Sn, Zr, Ti and Ce) show the most promise in terms of proton conductivity as the electrolyte membranes for IT-FCs. However, the low mechanical strength of the dry-pressed or cast membranes reported in the literature limits their applications under stress in large IT-FCs with planar cell configuration. Development of a sintering process is thus needed by which to enhance the mechanical strength of such membranes so that they may be suitable for commercial applications. Further, pyrophosphate membranes of the prior art suffer a severe drop in proton conductivity during known sintering methods, and methods to restore the proton conductivity to its pre-sintered level is also much needed.

SUMMARY

In some embodiments, the disclosure herein provides methods that restore the proton conductivity of sintered pyrophosphate membranes. The sintered pyrophosphate membranes may comprise $SnP_2O_7$, or In-doped $SnP_2O_7$, wherein, in some embodiments the In-doped $SnP_2O_7$ is $Sn_{0.9}In_{0.1}P_2O_7$. In some embodiments, phosphoric acid is added into the sintered pyrophosphate membrane and reacts with the degraded pyrophosphate species to recover the chemical composition and structure of the original pre-sintered pyrophosphates and thereby restore mechanical strength and proton conductivity of the membrane.

In some embodiments, a method of restoring proton conductivity to a sintered pyrophosphate membrane comprises adding a phosphoric acid to the sintered pyrophosphate membrane, wherein the membrane comprises a pyrophosphate-decomposition product; reacting the phosphoric acid, and pyrophosphate-decomposition product to form a regenerated-pyrophosphate species; and restoring the proton conductivity of the sintered pyrophosphate membrane comprising the regenerated-pyrophosphate species, wherein the proton conductivity is at least equivalent to the proton conductivity of a non-sintered pyrophosphate membrane is disclosed. In another embodiment, a method of restoring proton conductivity to a sintered pyrophosphate membrane is disclosed wherein the sintered pyrophosphate is $SnP_2O_7$, or In-doped $SnP_2O_7$, in a further embodiment the sintered pyrophosphate is $Sn_{0.9}In_{0.1}P_2O_7$.

In some embodiments of the method of restoring proton conductivity to a sintered pyrophosphate membrane, the pyrophosphate-decomposition product comprises $SnO_2$. In some further embodiments the regenerated-pyrophosphate species comprises at least one of: $SnP_2O_7$, In-doped $SnP_2O_7$, fused phosphoric acid; or phosphorus oxide.

In other embodiments of the method of restoring proton conductivity to the sintered pyrophosphate membrane, the restored proton conductivity of the sintered membrane is about 0.061 S cm−1 at 225° C.

In some other embodiments a sintered pyrophosphate membrane is disclosed, wherein the membrane has a restored proton conductivity and comprises a regenerated-pyrophosphate species and a fused phosphoric acid, wherein the sintered pyrophosphate membrane comprises a proton conductivity at least equivalent to a pyrophosphate membrane that is non-sintered. In some further embodiments, the membrane comprises at least one of: high proton conductivity, high selectivity, high mechanical strength, or has a low cost of manufacture, as compared to a non-sintered pyrophosphate membrane.

In other embodiments, the restored sintered pyrophosphate membrane disclosed herein is between 0.5 $cm^2$ and 150 $cm^2$ in size, in other embodiments the restored sintered pyrophosphate membrane is between 1 $cm^2$ and 100 $cm^2$ in size, in another embodiment the restored sintered pyrophosphate membrane is between 1 $cm^2$ and 25 $cm^2$ in size, in further embodiments the restored sintered pyrophosphate membrane is between 5 $cm^2$ and 25 $cm^2$ in size, in a still further embodiment the restored sintered pyrophosphate membrane is 20 to 25 $cm^2$ in size, and in another embodiment the restored sintered pyrophosphate membrane is 25 $cm^2$ in size.

In some other embodiments of the sintered pyrophosphate membrane with restored proton conductivity, the membrane comprises between 1% to 50% regenerated pyrophosphate species. In some embodiments the membrane comprises between 10% to 20% regenerated pyrophosphate species, in other embodiments the membrane comprises between 17.7% to 20% regenerated pyrophosphate species. In some embodiments weights may be molar weights. In some embodiments weights may be weight %. In some other embodiments the between 10% to 20% regenerated pyrophosphate species is measured in weight % of the total pyrophosphate species that comprises the regenerated membrane. In some embodiments of the sintered pyrophosphate membrane the regenerated pyrophosphate species comprise at least one of $SnP_2O_7$, In-doped $SnP_2O_7$, fused phosphoric acid; or phosphorus oxide, in another embodiment the phosphorous oxide is at least one of $PO$, $P_2O_3$, $P_4O_7$, $P_4O_8$, $P_4O_9$, and $P_2O_5$.

In some embodiments of the sintered pyrophosphate membrane disclosed herein the membrane comprises an Intermediate Temperature Fuel Cells (IT-FCs), in other embodiments the membrane comprises a planar Intermediate Temperature Fuel Cells (IT-FCs), and in further embodiments the membrane of the planar Intermediate Temperature Fuel Cells (IT-FCs) comprises an active area of between 0.5-100 $cm^2$, in a still further embodiment the active area is between 0.5-25 $cm^2$. In other embodiments, the Intermediate Temperature Fuel Cell comprises a peak power density of 78 mW cm–2 at 225° C., and in a further embodiment the Intermediate Temperature Fuel Cell runs at 100 mW $cm^{-2}$ at 0.6 V for 45 Hr. at 225° C.

In some embodiments, a method of making a restored sintered pyrophosphate membrane is disclosed herein, where the method comprises: reacting $H_3PO_4$ and $SnO_2$ in deionized water to form a paste; calcinating the paste to form an $SnP_2O_7$; dry ball-milling the $SnP_2O_7$ to form a powder; mixing the powder and deionized water, and milling to form a slurry; casting the slurry in a mold, sintering the mold; and forming a sintered pyrophosphate membrane wherein the membrane comprises a pyrophosphate-decomposition product; placing the sintered pyrophosphate membrane into $H_3PO_4$ and heating to form a restored pyrophosphate membrane, wherein the membrane comprises a proton conductivity at least equivalent to a pyrophosphate membrane that is non-sintered. In some embodiments of the method, mixing further comprises adding corn starch to the powder and deionized water, and milling to form the slurry, and in other embodiments sintering the mold further comprises removing the corn starch and forming a porous sintered pyrophosphate membrane wherein the membrane comprises pores and pyrophosphate-decomposition product. In some further embodiments of the method removing is by burning. In some embodiments of the method, the sintered pyrophosphate is $SnP_2O_7$, In-doped $SnP_2O_7$, $In_{0.1}Sn_{0.9}P_2O_7$ or combinations thereof. In a further embodiment of the method of making a restored sintered pyrophosphate membrane disclosed herein, reacting further comprises adding $In_2O_3$ to the $H_3PO_4$ and $SnO_2$ in deionized water to form the paste.

In some embodiments, the disclosure therefore provides a method of producing low-cost, highly proton conductive, highly selective, and mechanically strong pyrophosphate electrolyte membranes for IT-FCs, wherein such membranes may also comprise Indium doped pyrophosphate membranes. Such membranes and the subsequent cells they comprise may require no external humidification, or very little humidification as compared to similar products of the prior art, and thus may be smaller in size. Membranes disclosed herein may be fabricated such that they are greater than 1 $cm^2$ in size. In some embodiments such membranes may be fabricated by large scale production, such embodiments thus makes commercialization of IT-FCs possible.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various exemplary embodiments of the invention. However, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

The drawing figures are not necessarily to scale. Certain features and components herein may be shown exaggerated in scale or in somewhat schematic form and some details of conventional elements may be omitted in interest of clarity and conciseness.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness. In the following discussion and in the claims, the terms "including" and "comprising" are used in an open-ended fashion, and thus should be interpreted to mean "including, but not limited to . . . ." Also as used herein, the term "about," when used in conjunction with a percentage or other numerical amount, means plus or minus 10% of that percentage or other numerical amount. For example, the term "about 80%," would encompass 80% plus or minus 8%. Further, references cited herein are thereby incorporated in their entirety.

Pyrophosphate ($SnP_2O_7$) membranes need a sintering process to achieve the required mechanical strength to allow their use as the electrolyte of intermediate temperature fuel cells (IT-FCs) which operate at temperatures ranging from 200 to 300° C. The sintering process however, causes a severe drop of proton conductivity due to the decomposition of $SnP_2O_7$ and release of residual fused phosphoric acid and/or phosphorous oxides in the membrane network.

Disclosed herein, in some embodiments are methods of restoring the proton conductivity of such membranes by introducing phosphoric acid in a sintered membrane network to react with the degraded $SnP_2O_7$ for restoration of the membrane's proton conductivity and retaining the mechanical stability obtained through the designed sintering protocol, wherein the decomposition product $SnO_2$ is regenerated and converted back to $SnP_2O_7$ with minimal fused phosphoric acid. In some embodiments the pyrophosphate may be $Sn_{0.9}In_{0.1}P_2O_7$ or other doped species.

In some embodiments, highly proton conductive, highly selective and mechanically strong pyrophosphate membranes for IT-FCs may be fabricated in large scales, wherein typically the cell will comprise a planar configuration, and the proton conductivity of the sintered membranes may be restored.

In some embodiments the structure and composition of the sintered membranes is restored to that of the as-prepared (pre-sintered) samples such that the proton conductivity in restored and a minimal change of mechanical strength may be experienced. In some embodiments, a planar IT-FC single cell with such restored membranes that are between 0.5 cm² and 250 cm² may be produced, and in some embodiments larger sizes for example 25 to 150 cm² and larger may be may be commercially viable. Such IT-FCs as disclosed herein are very promising clean power sources for a wide range of applications (such as stationary; mobile and in between). As stationary power sources, they may also make a much needed impact on the current power grid. Independent, smart, and green micro-grids may also be built based on IT-FCs fueled with the hydrogen produced from various pathways, renewable and non-renewable energy sources. In one embodiment IT-FCs that operate at 200-400° C. do not require highly pure hydrogen, therefore high cost pure hydrogen fuel may not be a requirement with such membranes and cells, thereby decreasing operating costs. Similarly, such IT-FCs may power zero-emission vehicles, eliminating the health hazards caused by exhaust gases from internal combustion engine vehicles. In some embodiments, IT-FCs technology hybridized with traditional Distributed Generation (DG) systems may provide fuel-to-electric power conversion efficiencies in excess of 70% on a Lower Heating Value (LHV) also offer emissions reduction and power-grid independence.

Further, polymer electrolyte membrane fuel cells (PEMFCs) and solid oxide fuel cells (SOFCs) are currently two major types of fuel cells on the path to commercialization, IT-FCs of the present disclosure comprise an emerging technology with a potential to replace them due to their superior technical properties, as listed in Table 1. However, IT-FCs face technical challenges mainly from the use of inorganic electrolyte membranes. Embodiments of the methods herein described address these technical challenges. Proton conducting IT-FCs with embodiments of the membranes disclosed herein exhibit promising commercialization as compared to membranes of the prior art (Table 2).

TABLE 1

Technical metrics of IT-FCs, PEMFCs, and SOFCs.

| Metric | IT-FCs, Value | PEMFCs, Value | SOFCs, Value |
| --- | --- | --- | --- |
| Operating temperature | 200-300° C. | <100° C. | 500-1000° C. |
| Impurity tolerance | High | Low | High |
| Fuel flexibility | High industrial grade $H_2$ (cheaper and widely available, requiring in some embodiments no humidification) | Low ultra-high purity $H_2$ and humidification | High industrial grade $H_2$ & H—C |
| Catalyst | Precious/Non-precious metals, reasonable | Precious metals, Expensive | Non-precious metals, low-cost |
| Construction materials | TBD | Low | High |

TABLE 2

Technical metrics of the proposed concept and existing IT-FCs technology.

| Metric | Restored membrane technology, Value | Existing technologies, Value |
| --- | --- | --- |
| Proton conductivity of electrolyte membranes | ~0.1 S cm$^{-1}$ (5 cm²; acceptable cell configuration) | Mostly <0.1 Scm−1 Few: ~0.1 S cm$^{-1}$; <1 cm²; non fuel cell configuration, no durability testing |
| Mechanical strength of electrolyte membranes | Strong (improved sintering method) | Weak |
| System simplification | No External Humidification | Humidity factor (Not clear) |
| Selectivity of electrolyte membranes | High | Low |
| Process cost | Expected Low TBD (compare to PEMFCs) | Not applicable |
| Cell type and active area | Planar type, 25 cm² | Button cell, <1 cm2 |
| Integration in large scale IT-FCs | Feasible | Non-feasible |

Thus, embodiments of the methods herein described may produce low-cost, highly proton conductive, highly selective, and mechanically strong pyrophosphate electrolyte membranes for IT-FCs at large scales. In some embodiments, 25 cm² planar-type IT-FCs comprising embodiments of the restored electrolyte membranes may be produced by embodiments of the methods herein described, wherein regeneration of the composition and structure of sintered electrolyte membranes results in the restoration of the proton conductivity lost during sintering. In some embodiments, property-composition-structure relationships of the proton conductivity degradation during sintering and the introduction of the appropriate chemical reactions inside the membranes allow for regeneration of the composition and structure.

In the prior art, $SnP_2O_7$ and its doped electrolytes have largely been tested in single button cells with a small active area of 1 cm$^2$ or less. The small membranes are normally prepared by dry-pressing pyrophosphate powders in a die with a pressure of 1-2×10$^3$ kgf cm$^{-2}$. This method is impractical for fabricating large membranes for IT-FCs as the required pressure is too large. Casting is an appropriate method to fabricate such large membranes. The low mechanical strength of dry-pressed or cast membranes however, is not suitable for their use under stress in large IT-FCs with planar cell configuration. A sintering process is thus needed to enhance the mechanical strength of the membranes to realize their applications in IT-FCs at large scale. It is recognized that the pyrophosphate membranes suffer a severe drop in proton conductivity during sintering due to the decomposition of the pyrophosphates and release of fused phosphoric acid and/or phosphorous oxides into the membrane. The disclosure presented herein, addressed such issues by providing a method of restoration of the pyrophosphates of the membrane and hence regain the proton conductivity of the sintered samples. Thus, embodiments of the disclosure herein provide a method to restore the proton conductivity of sintered $SnP_2O_7$ (or doped $SnP_2O_7$, such as but not limited to $Sn_{0.9}In_{0.1}P_2O_7$) membranes, wherein the reaction of phosphoric acid ($H_3PO_4$) with degraded $SnP_2O_7$ species can regenerate $SnP_2O_7$ from the decomposed $SnP_2O_7$ and therefore lead to the restoration of proton conductivity and mechanical strength of the membrane. The regenerated membrane may thus be tested in a planar cell to confirm the restoration of membrane performance.

EXAMPLES

Experimental Details

Example 1

$SnP_2O_7$ was prepared by the reaction of $H_3PO_4$ and tin dioxide ($SnO_2$) (W. Li, A. B. Bose, I. A. Rusakova, J. Power Sources, 307 (2016) 146-151, (incorporated herein in its entirety)). The mixture of $SnO_2$ (99.9%, Afla Aesar), $H_3PO_4$ (85.6%, ACS reagent, J.T. Baker), and deionized water at a molar ratio of 1:2.2:6 was stirred in sequence at ca. 110° C. overnight (covered by aluminum foil), at 220° C. for 1 h, and at 250° C. until hard to stir. The paste was calcined at 650° C. for 2.5 h to finally obtain $SnP_2O_7$. The as-synthesized $SnP_2O_7$ was dry ball-milled (agate balls and jar, SPEX 8000M Mixer/Mill) for 20 min. The obtained powders were then mixed with corn starch (Argo®, ACH food companies) and deionized water at a mass ratio of 10:0.5:2.85. The mixture was wet ball-milled (HDPE bottle, agate balls, SPEX 8000M Mixer/Mill) for 10 min. The gained slurry was then casted in a mold (φ=25 mm) at room temperature to form a membrane, which was further heated in a tube furnace at a ramp rate of 5° C. min$^{-1}$ to 1050° C. for 10 h for sintering to get a porous sintered $SnP_2O_7$ membrane. The pores in the membrane were produced by burning off the starch during sintering. The starch burn-off during sintering was confirmed by comparing the mass changes of two $SnP_2O_7$ pellet samples (φ=25 mm) with and without starch before and after sintering. Non-porous sintered $SnP_2O_7$ membranes were also prepared without using starch. To restore the proton conductivity, the porous sintered membrane was immersed into $H_3PO_4$ (85.6%), heated at ca. 110° C. overnight and subsequently at about 180° C. for 3 h. It was then heated in a tube furnace at 500° C. for 2 h. The process and membrane are thus denoted as restoration process and restored $SnP_2O_7$ membrane, respectively. To estimate the sum content of the fused phosphoric acid and phosphorous oxides in the restored $SnP_2O_7$ membranes, a simple route was designed, based on the ability of all the fused phosphoric acid and phosphorous oxides to combine with water to regenerate $H_3PO_4$.

The amount of $H_3PO_4$ determined by measuring the pH of the suspension of restored $SnP_2O_7$ powders in water is then used to estimate the sum content of the fused phosphoric acid and phosphorous oxides. The X-ray diffraction (XRD) patterns were acquired on a Siemens D5000 diffractometer (Cu Kα radiation, 40 keV, 30 mA). The microstructure of samples was characterized on a JEOL 2010 transmission electron microscope (TEM) operated at 200 kV. The morphology of the cross sections of the membranes was examined on a LEO 1525 field emission scanning electron microscope (SEM). A sintered and restored $SnP_2O_7$ membrane (thickness of 1.3 mm, diameter of 25 mm) was sandwiched between two round carbon cloth electrodes (0.5 cm$^2$, 20% Nafion (DuPont, EW . 1100), Pt/C (40%, HiSPEC 4000, Alfa Aesar), 1.0 mg Pt cm$^{-2}$, E-TEK) to form an electrode membrane assembly (MEA, active area=0.5 cm$^2$), as shown in FIG. 3B. It was then placed in a planar single cell-testing fixture (active area of 5 cm$^2$, serpentine channels, Fuel Cell Technologies, FIG. 3B) for electrochemical impedance spectroscopy (EIS) measurement. The EIS experiments were conducted at 0.5 V in the frequency range of 10,000-0.1 Hz with an AC amplitude of 5% on an impedance module (880, Scribner Associates) embedded in the fuel cell station (850e, Scribner Associates) or at open circuit voltage (OCV) in the range of 300,000-5000 Hz with an AC amplitude of 100 mV on an electrochemical impedance analyzer (Solartron 1252 and 1287). The latter was applied for a sintered $SnP_2O_7$ membrane because the MEA using this membrane could not stably generate any current. Another MEA with a large restored $SnP_2O_7$ membrane (thickness of 0.85 mm, diameter of 40 mm) and two square carbon cloth electrodes (5 cm$^2$, 20% Nafion, 40% Pt/C, 2.5 mg Pt cm$^{-2}$, E-TEK) was made for fuel cell performance measurement. All of the EIS and fuel cell performance measurements were carried out at 225° C. with $H_2$ (50 sccm) and air (100 sccm), humidified at 30° C., fed into the anode and cathode, respectively.

Results and Discussion

Figure 5:
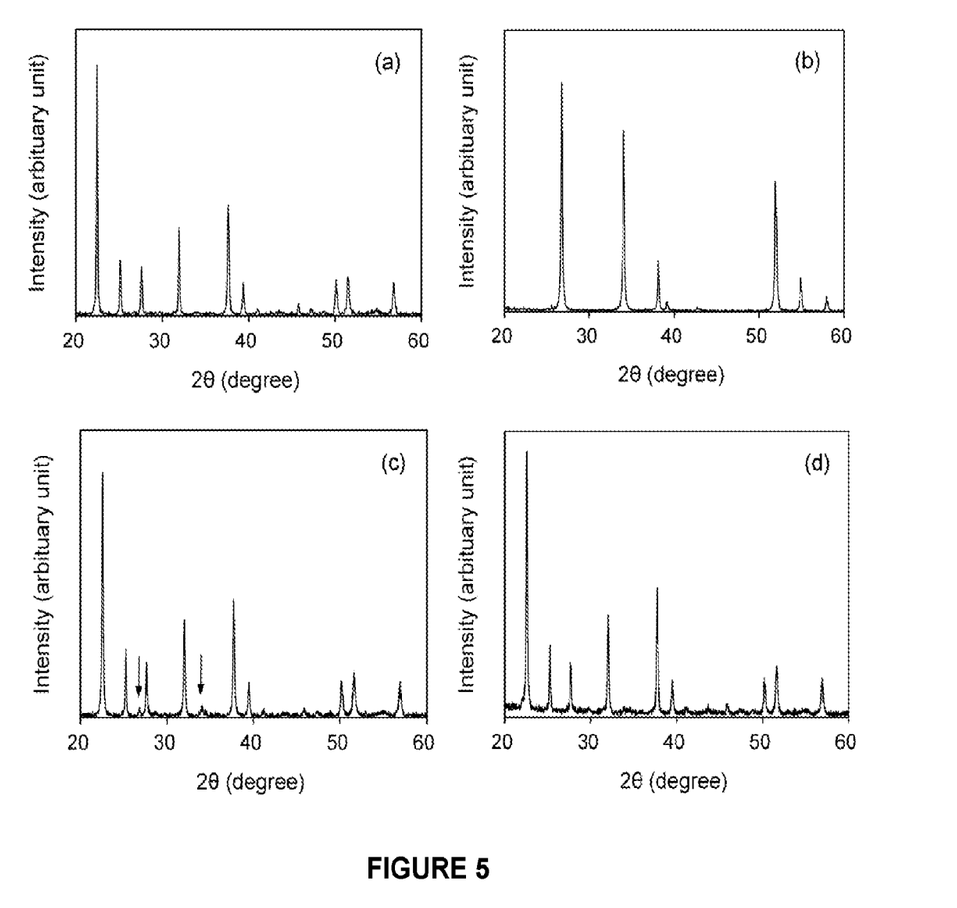
FIG. 5 shows the XRD patterns of (a) as-synthesized $SnP_2O_7$ powders, (b) $SnO_2$ powders, (c) a sintered $SnP_2O_7$ membrane, and (d) a restored $SnP_2O_7$ membrane. The two arrows in (c) indicate the reflections of $SnO_2$.

As disclosed above, $SnP_2O_7$ was prepared by the reaction of $SnO_2$ and $H_3PO_4$ at a molar ratio of 1:2.2. The XRD pattern of the as-synthesized $SnP_2O_7$ in FIG. 5a matches the standard pattern of $SnP_2O_7$ and does not have noticeable $SnO_2$ reflections as shown in FIG. 5b. These suggest that the as-synthesized $SnP_2O_7$ is single phase and the $SnO_2$ is completely converted during the synthesis. A $SnP_2O_7$ membrane (25 mm in diameter) was fabricated by casting $SnP_2O_7$ slurry in a mold at room temperature. To enhance the mechanical strength, the $SnP_2O_7$ membrane was sintered at 1050° C. for 10 h. The XRD pattern of the membrane after sintering in FIG. 5c did not show significant shifts of reflections, it clearly exhibited new reflections located at 2θ=26.7° and 32.1°, which are two major reflections of $SnO_2$ as shown in FIG. 5b. Other reflections of $SnO_2$ are unnoticeable because of low intensity and partial overlap with the reflections of $SnP_2O_7$. The occurrence of the $SnO_2$ phase is caused by the decomposition of $SnP_2O_7$ (Xu, X. Wu, WIREs Energy Environ. 3 (2014) 24-41; O. Paschos, J. Kunze, U. Stimming, F. Maglia, J. Phys. Condens. Matter. 23 (2011) 234110; X. Xu, S. Tao, P. Wormald, J. T. S. Irvine, J. Mater. Chem. 20 (2010) 7827-7833).

In some embodiments, the presence of $SnO_2$ phase changes the structure and composition of the material and may cause significant decrease of proton conductivity. The sintering process also may also cause the release of fused phosphoric acid and/or phosphorous oxides in the $SnP_2O_7$ membranes, resulting in the decrease of proton conductivity. In some further embodiments, in order to restore the proton conductivity, porous sintered membranes were prepared by using corn starch (as disclosed above) as a pore former and binder. $H_3PO_4$ was then introduced into the membrane through the pores, and reacted in-situ with the degraded $SnP_2O_7$ species to regain the pre-sintered composition and thus the proton conductivity.

$SnO_2$ reflections do not contribute to the XRD pattern of the restored $SnP_2O_7$ membrane in FIG. 5d, as the restoration process converts the $SnO_2$ and the degraded $SnP_2O_7$ produced during sintering into the pre-sintered $SnP_2O_7$ and thus restores the proton conductivity.

In further embodiments, no significant peak shifts or new reflections were observed, suggesting the process in some embodiments does not alternate or change the structure of $SnP_2O_7$ samples. The restored $SnP_2O_7$ is thus amorphous because of a high ratio of $H_3PO_4$ to $SnO_2$ and/or degraded $SnP_2O_7$. In some embodiments about 17.7-20.0% (by molar weight) of the restored membrane is regenerated $SnP_2O_7$ and comprises and fused phosphoric acid (and/or phosphorous oxides).

Figure 6:
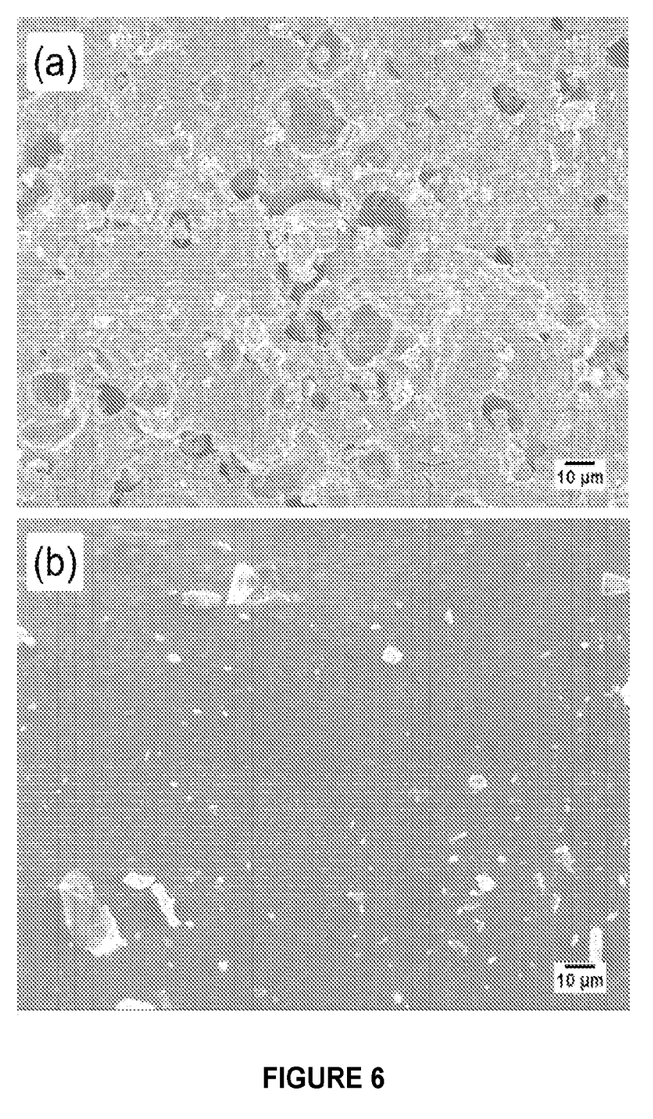
FIG. 6 shows SEM images of the cross sections of (a) a porous sintered $SnP_2O_7$ membrane and (b) a restored $SnP_2O_7$ membrane.

In some embodiments, the porous sintered $SnP_2O_7$ membrane has pores of about $\phi$=5-20 mm (distributed throughout the membrane, as shown by the SEM image of the cross section in FIG. 6a) which were created by burning off the starch particles inside the membrane (as disclosed above). The gases from the burning find pores and/or create pathways out of the membrane, by which the liquid $H_3PO_4$ can then reach deep inside the membrane for restoration. After the restoration process, the pores inside the membrane are no longer present as shown by the SEM image of the cross section of the restored membrane (FIG. 6b), which may be due to the volume expansion caused by the conversions of $SnO_2$ and partially decomposed $SnP_2O_7$ into $SnP_2O_7$ as well as the conversion of crystalline $SnP_2O_7$ into amorphous $SnP_2O_7$. The reformed $SnP_2O_7$ may comprise polymorphic mixtures of $SnP_2O_7$.

Figure 7:
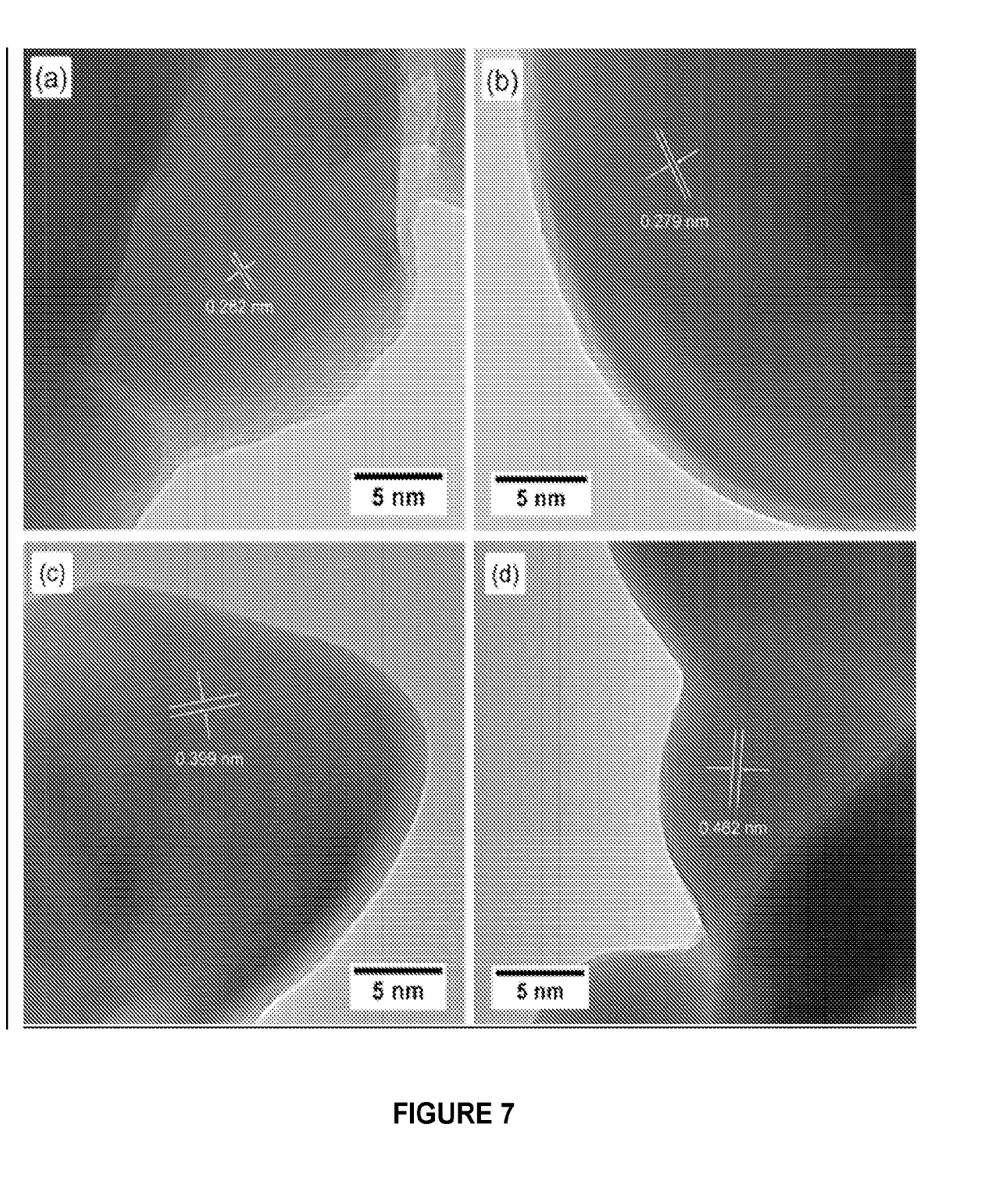
FIG. 7 shows HRTEM images of the particles from (a, b) the porous sintered membrane and (c, d) the restored membrane.

In some embodiments, high-resolution TEM (HRTEM) images of the samples were taken to examine the differences in microstructure and crystallinity. FIG. 7 shows HRTEM images of the cross sections of (a, b) a porous sintered $SnP_2O_7$ membrane and (c, d) a restored $SnP_2O_7$ membrane and confirmed that the restored membrane is more amorphous than the sintered $SnP_2O_7$ membrane. Four typical HRTEM images of the samples are presented in FIG. 6. The HRTEM images of the sintered sample in FIGS. 7a and b show lattice-plane spacing values of 0.282 nm and 0.279 nm respectively, corresponding to the {220} planes of $SnP_2O_7$. The HRTEM images of the restored sample in FIGS. 7c and d show lattice-plane spacing values of 0.399 nm and 0.462 nm respectively, corresponding to the {200} and {111} planes of $SnP_2O_7$. No significant changes are observed in the lattice-plane spacing values compared to that (0.281 nm, 0.398 nm, and 0.461 nm) of standard pre-sintered $SnP_2O_7$. This suggests that the restoration process does not change the unit cell parameters of the crystalline parts of the samples. In some embodiments, it can be seen that both samples in part show lattice fringes, wherein the restored $SnP_2O_7$ has less clear fringes.

In some embodiments, holey TEM grids were used to look at the parts of the samples ($S_nP_2O_7$), above the holes, wherein no artifacts originated from the substrate. The HRTEM images of both samples have fringes, suggesting that the corresponding planes were aligned quite well with the zone axes. Moreover, both samples do not have a significant difference in thickness because of the similar contrast and brightness. The blur of the lattice fringes implies that the restored sample has less crystallinity or a greater amorphous phase, and that the regenerated $SnP_2O_7$ from the reaction of $H_3PO_4$ and $SnO_2$, produced from the decomposition of $SnP_2O_7$ during sintering is amorphous.

Figure 8:
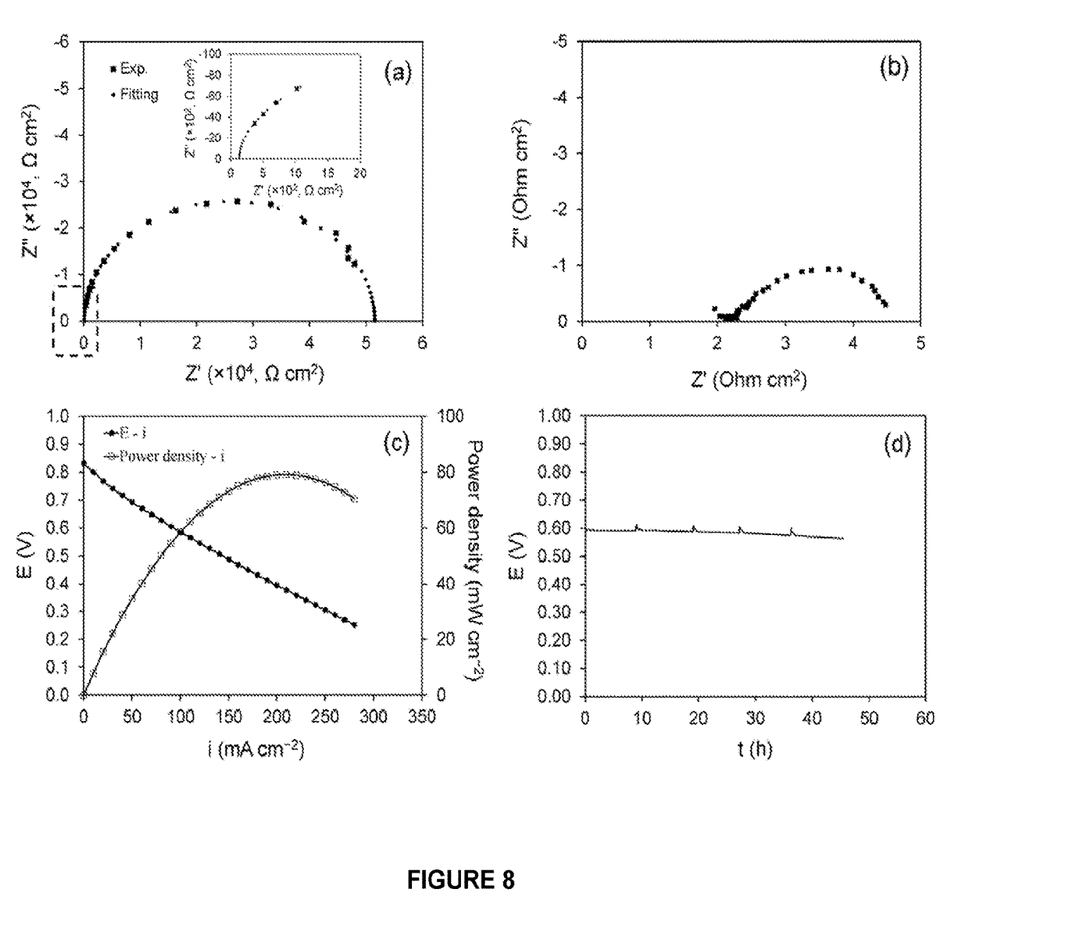
FIG. 8 shows EIS spectra of the MEA with (a) a sintered $SnP_2O_7$ membrane (thickness=1.30 mm, diameter=25 mm) and (b) a restored $SnP_2O_7$ membrane (thickness=1.30 mm, diameter=25 mm) tested in a single cell testing fixture at 225° C.; (c) polarization and power density curves as well as (d) degradation curve at constant current density of 100 mA $cm^{-2}$ of the MEA with a restored $SnP_2O_7$ membrane (thickness=0.85 mm, diameter=40 mm) at 225° C. with $H_2$ (50 sccm) and air (100 sccm), humidified at 30° C., fed into the anode and cathode, respectively. The inset in (a) is the zoom of the low impedance region in the dashed-line frame.

In another embodiment, a sintered or restored $SnP_2O_7$ membrane (25 mm in diameter, 1.3 mm in thickness) was sandwiched between two round carbon cloth electrodes (0.5 $cm^2$, 20% Nafion, Pt/C (40%), 1.0 $mg_{Pt}$ $cm^{-2}$, ETEK) to form an electrode membrane assembly (MEA, FIG. 3b). It was then assembled in a planar single cell testing fixture (FIG. 3b, serpentine channels, Fuel Cell Technologies) for fuel cell performance measurement. The MEA with a sintered membrane could not stably generate any current because of the high resistivity (1.0×10³ Ohm cm) or low proton conductivity (9.7×10⁻⁴ S cm⁻¹) of the membrane at 225° C. as determined by the EIS spectra in FIG. 8a. The proton conductivity is much lower than the expected literature value (0.06 S cm⁻¹), and the reduction is caused by the loss of phosphorus species, which induces the deficiency of $P_2O_7^{4-}$ in the crystal lattice. Although the deficiency is slight, (supported by the occurrence of a small amount of $SnO_2$ as shown by the XRD pattern in FIG. 5c) it brings about the significant decrease of proton conductivity. However, the EIS measurement result in FIG. 8b shows that the restored membrane has a proton conductivity of 0.061 S $cm^{-1}$ at 225° C. This value matches the highest conductivity of non-sintered $SnP_2O_7$ membranes in the literature (M. Nagao, et al., J. Electrochem. Soc. 153 (2006) A1604eA1609. In some embodiments, the restoration of proton conductivity may be attributed to three factors: first, the deficiency of $P_2O_7^{4-}$ is remedied, as supported by the disappearance of the $SnO_2$ reflections in the XRD pattern in FIG. 5d; second, more amorphous $SnP_2O_7$ is present in the restored sample, as observable in the HRTEM images in FIG. 7; and third, in some embodiments a small amount of $H_3PO_4$ may reside within the amorphous phase because of a high ratio of $H_3PO_4$ to $SnO_2$ and degraded $SnP_2O_7$ in the restoration process. In some embodiments, the amorphous $SnP_2O_7$ and residual $H_3PO_4$ comprise the major source of proton conductivity over cubic $SnP_2O_7$. This restoration of proton conductivity makes the now restored membrane work efficiently and effectively as an electrolyte in an IT-FC.

In another embodiment, an MEA (5 $cm^2$) using a large restored $SnP_2O_7$ membrane (thickness=0.85 mm, diameter=40 mm) was prepared for fuel cell performance measurement. A typical polarization curve in FIG. 8c was acquired at 225° C. with $H_2$ (50 sccm) and air (100 sccm), humidified at 30° C., fed into the anode and cathode, respectively. In some embodiments, the OCV is about 0.88 V, which is a lower than that (0.95-1.0 V) measured in a button cell, but in a good agreement with that measured in a planar cell. In some further embodiments the OCV may be improved by completely removing the pores in the membrane and reducing the internal leakage of the planar cell testing fixture. The power density curve in FIG. 8c shows a peak powder density of 78 mW $cm^{-2}$ and in some embodiments may be improved further by increasing the OCV and optimizing the catalyst layers, such as using intermediate catalyst layers and higher Pt loadings. The fuel cell may also exhibited a steady running at a constant current density of 100 mA $cm^{-2}$ for 45 h at a degradation rate of 0.7 mV $h^{-1}$, as shown in FIG. 8d.

In some embodiments, a slight decrease of performance may be caused by the degradation of the membrane and the catalyst (Pt/C), especially at the cathode. The fused phosphoric acid and/or phosphorous oxides in the membrane may leach out gradually with water vapor, leading to the decrease of proton conductivity and possible increase of gas crossover. However, in some embodiments minimizing the residual of these compounds by reducing the pore size of the sintered $SnP_2O_7$ membranes by using a smaller starch molecule, such as but not limited to rice starch (4.4 mm), instead of corn starch (16.9 mm) may reduce the leaching. In another embodiments however, corrosion of the carbon black support of Pt/C catalyst at the cathode in IT-FCs is considered to be more severe than that in polymer electrolyte membrane fuel cells (PEMFCs) because the former has a much higher operating temperature (200-300° C.) than the latter (<100° C.). It has been well known that carbon support corrosion is one of the major factors causing the degradation of PEMFCs. Therefore, carbon support corrosion of Pt/C occurs at the cathode of IT-FC partially contributes to the performance degradation shown in FIG. 8d. In some embodiments, four narrow regions (about a 50 min duration) with performance changes at intervals of about 8 h were observed in this constant current operation. These changes are not sharp changes and might be caused by the disturbances of equilibrium in the components (membrane and/or electrodes) of the IT-FC. Both the power density and durability may be further improved in the future by improving the materials, the restoration method of the sintered $SnP_2O_7$ membranes, and the design of electrodes and MEAs.

Disclosed herein, are further embodiments of methods of restoring the proton conductivity of the sintered pyrophosphate membranes by introducing phosphoric acid into/inside a sintered $SnP_2O_7$ membrane to react with the degraded $SnP_2O_7$ to restore the membrane and its proton conductivity.

In one embodiment, the decomposition product $SnO_2$ is converted back to $SnP_2O_7$, and fused phosphoric acid and/or phosphorous oxides (in the order of 17.7-20.0%) are regenerated. The proton conductivity is enhanced from $9.7\times10^{-4}$ S $cm^{-1}$ to 0.061 S $cm^{-1}$ at 225° C. A planar IT-FC (active area=5 $cm^2$) with a restored membrane (thickness=0.85 mm, diameter=40 mm) generates a peak power density of 78 mW $cm^{-2}$ without using intermediate catalyst layers at 225° C. In some embodiments it can steadily run for 45 h at 100 mA $cm^{-2}$ with a degradation rate of 0.7 mV $h^{-1}$ at 225° C. The fuel and oxidant are, respectively, $H_2$ (50 sccm) and air (100 sccm) humidified at 30° C.

Figure 1A:
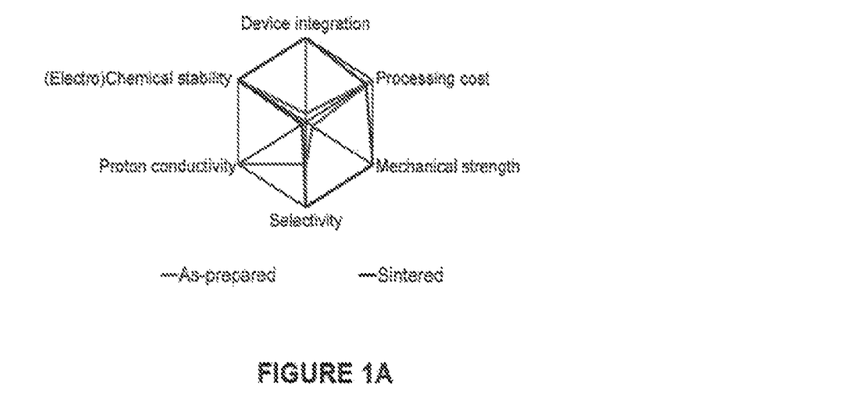
FIG. 1 shows radar diagrams of (a) as-prepared (prior art), and sintered membranes, and (b) sintered and restored membranes.
Figure 1B:
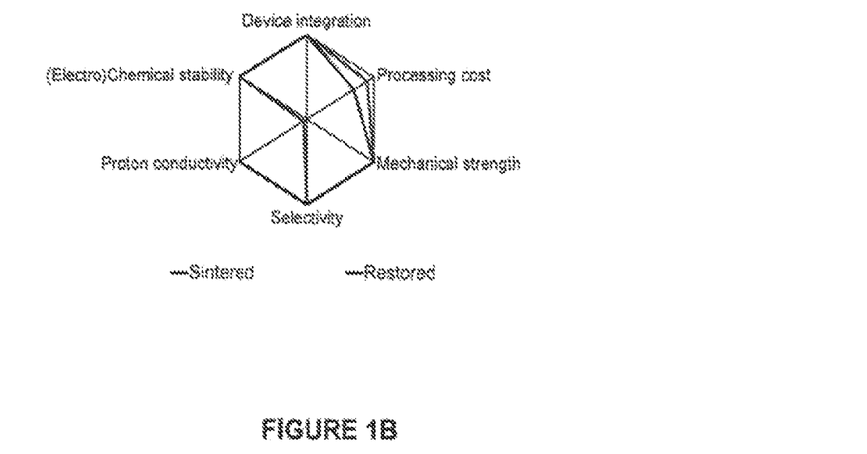

In other embodiments, shown (for example in the radar diagram in FIG. 1a) as-prepared membranes are poor in device integration and mechanical strength, while the sintered membranes are enhanced in these two properties but comprise poor proton conductivity. The restoration disclosed herein recovers the proton conductivity (with an acceptable increase in processing cost) as shown in the radar diagram in FIG. 1b.

Example 2

Figure 2A:
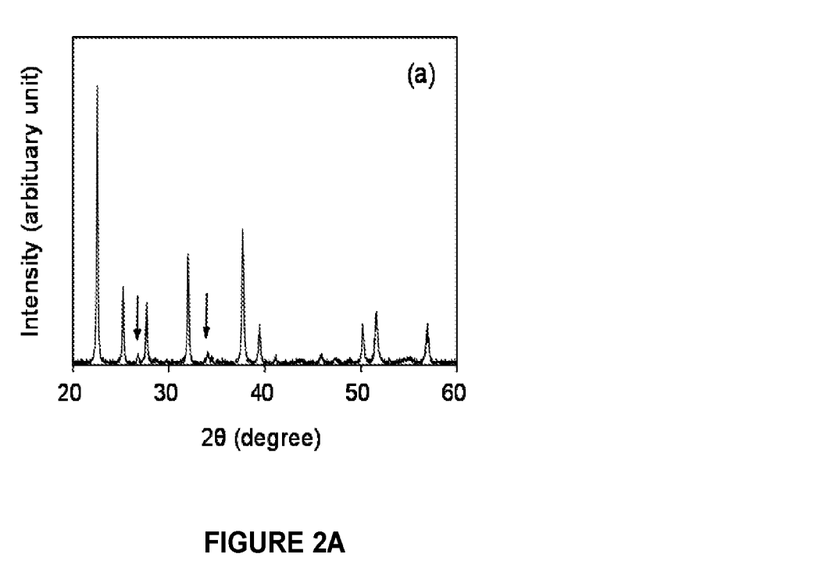
FIG. 2 shows XRD patterns of (a) a sintered $SnP_2O_7$ membrane, and (b) a restored $SnP_2O_7$ membrane. The two arrows in (a) indicate the reflections of $SnO_2$.

In some embodiments, $SnP_2O_7$ was synthesized by the reaction of $H_3PO_4$ and tin dioxide ($SnO_2$). The cast $SnP_2O_7$ membrane was sintered at 1050° C. for 10 h to enhance mechanical strength. The XRD pattern of the sintered $SnP_2O_7$ membrane in FIG. 2a shows the occurrence of $SnO_2$ reflections, indicating that the sintering causes the decomposition of $SnP_2O_7$. The presence of $SnO_2$ phase alters the structure and composition of the material and in some embodiments may cause a significant decrease in proton conductivity. The sintering also causes the release of fused phosphoric acid and/or phosphorous oxides in the $SnP_2O_7$ membranes, resulting in the decrease of proton conductivity [12].

Figure 2B:
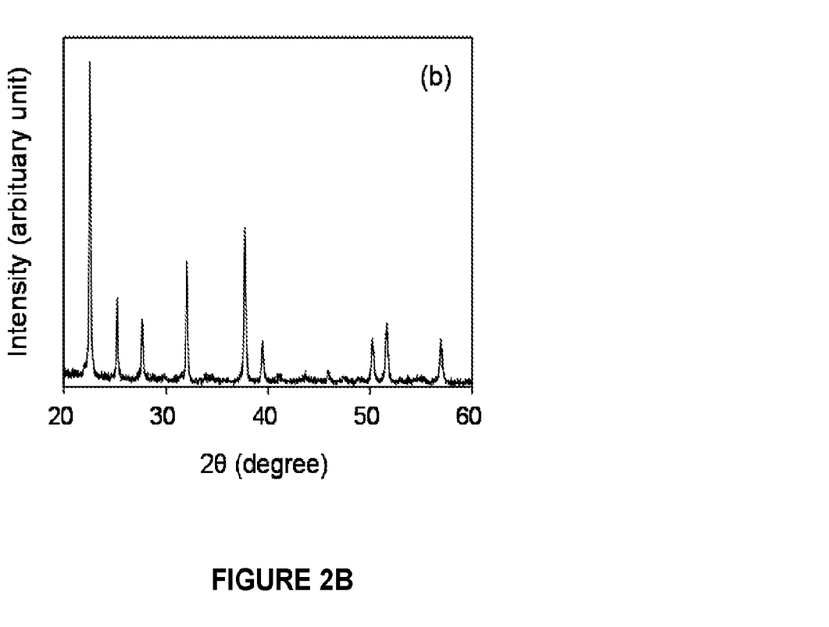

In a further embodiment, to restore the proton conductivity, porous sintered membranes were prepared by using corn-starch as a pore former and binder [4, 13]. $H_3PO_4$ was then introduced inside the membrane through the pores and reacted with the degraded $SnP_2O_7$ to regain the composition and structure and thus the proton conductivity. As expected the $SnO_2$ reflections do not appear in the XRD pattern of the restored $SnP_2O_7$ membrane in FIG. 2b. This suggests that the restoration process can convert the $SnO_2$ and degraded $SnP_2O_7$ produced during sintering into $SnP_2O_7$ and restore the proton conductivity.

Figure 3A:
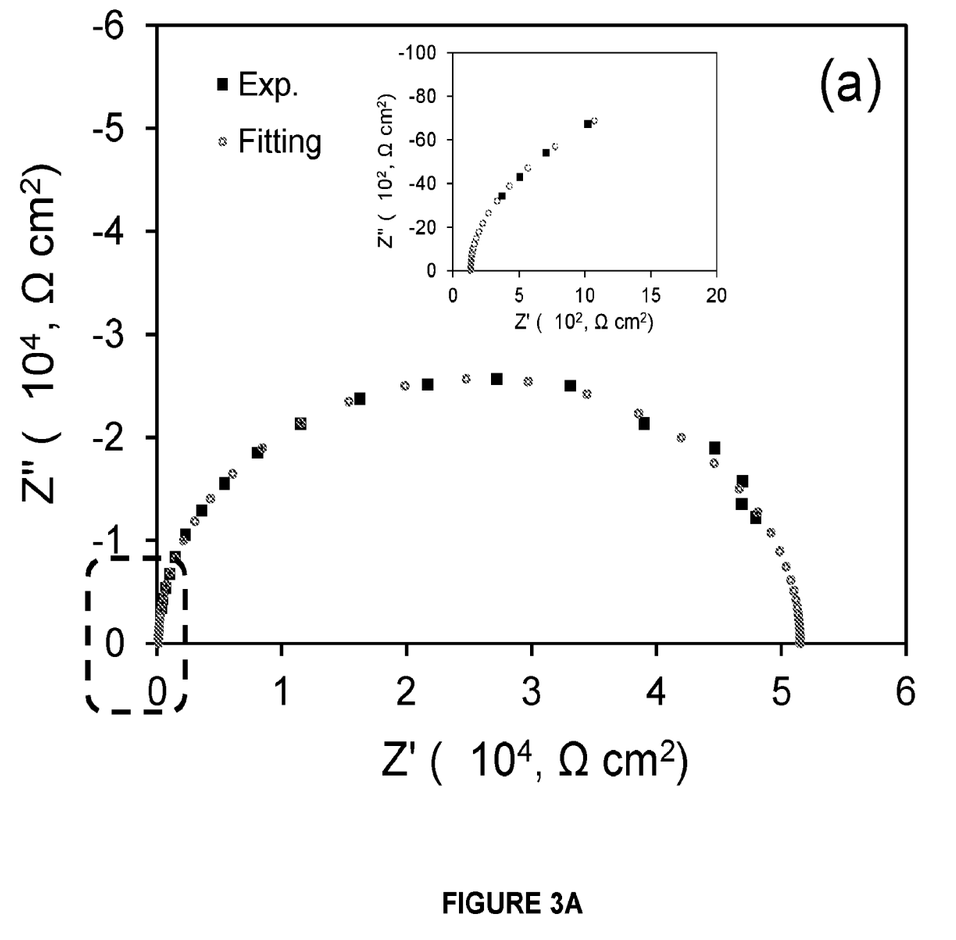
FIG. 3 shows EIS spectra of the MEA with (a) a sintered $SnP_2O_7$ membrane (thickness=1.30 mm diameter=25 mm) and (b) a restored $SnP_2O_7$ membrane (thickness=1.30 mm diameter=25 mm) tested in a planar single cell testing fixture at 225° C. The inset in (b) shows the MEA with an active area of 5 $cm^2$ in the testing fixture.
Figure 3B:
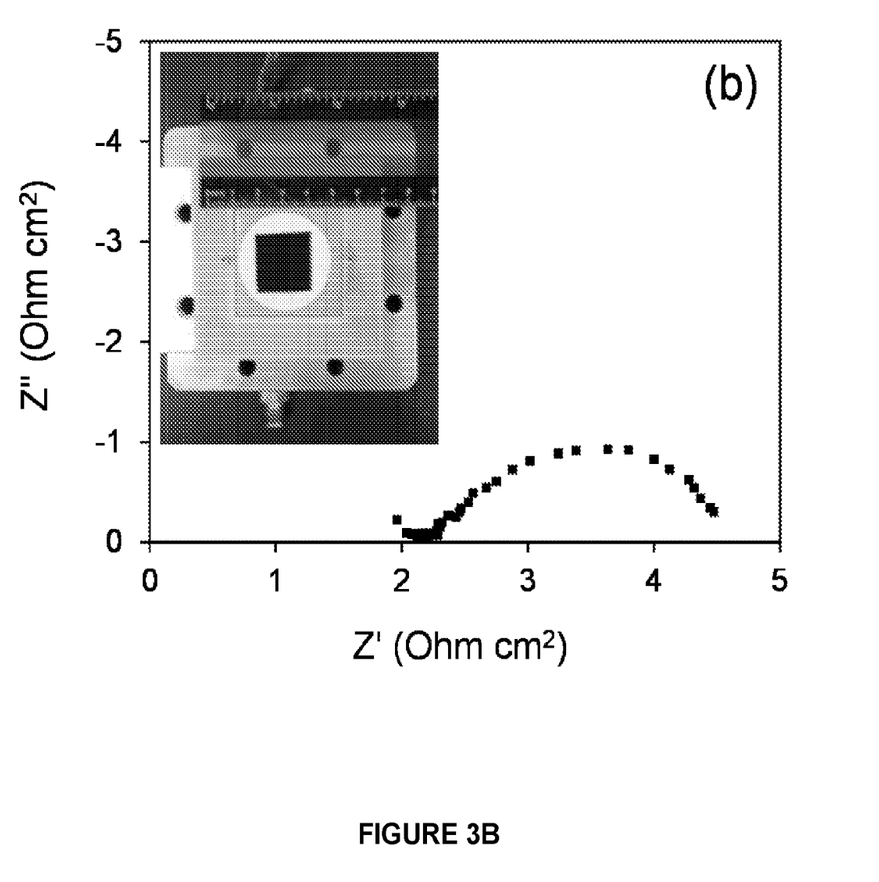

The electrochemical impedance spectroscopy (EIS) spectrum of FIG. 3a shows that an embodiment of the sintered membrane has a proton conductivity of $9.7\times10^{-4}$ S $cm^{-1}$ at 225° C., much lower than the value (ca. 0.06 S $cm^{-1}$) of the as-synthesized membranes reported in the literature. The EIS spectrum in FIG. 3b shows that the restored membrane has a proton conductivity of 0.061 S $cm^{-1}$ at 225° C. This value matches the highest conductivity of the as-synthesized $SnP_2O_7$ membranes in the literature.

Figure 4A:
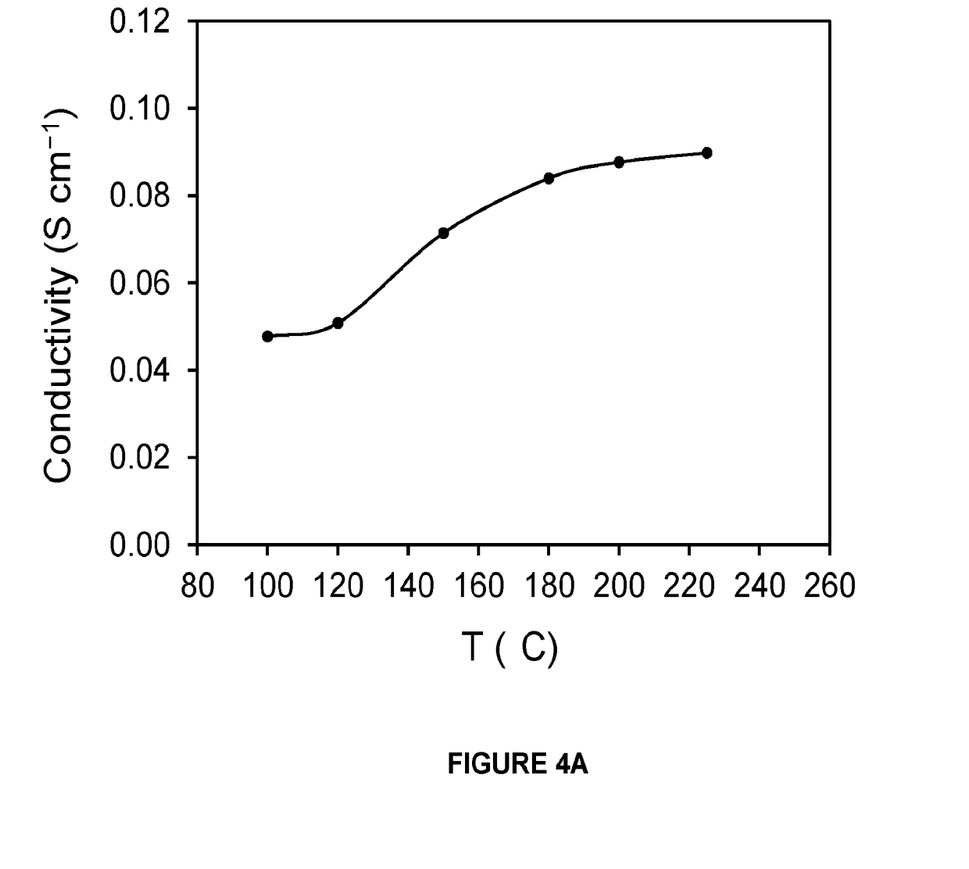
FIG. 4 shows (a) temperature dependence of proton conductivity, (b) polarization and power density curves, as well as (c) degradation curve at constant current density of 100 mA $cm^{-2}$ of restored $Sn_{0.9}In_{0.1}P_2O_7$ membranes (thickness=1.1 mm, diameter=25 mm) tested in a single cell. The membrane proton conductivity was measured at a fixed frequency of 1000 Hz with $H_2$ (50 sccm) and air (100 sccm), humidified at 30° C., fed into the anode and cathode, respectively. The polarization, power density and degradation curves were conducted at 225° C.
Figure 4B:
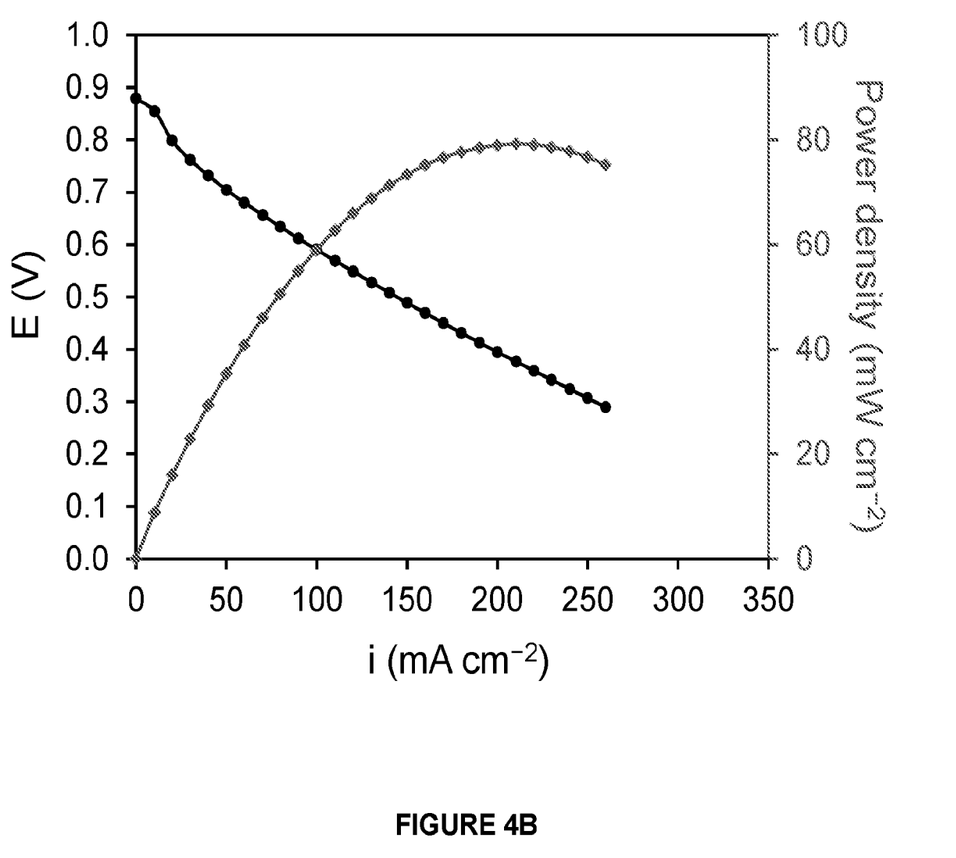
Figure 4C:
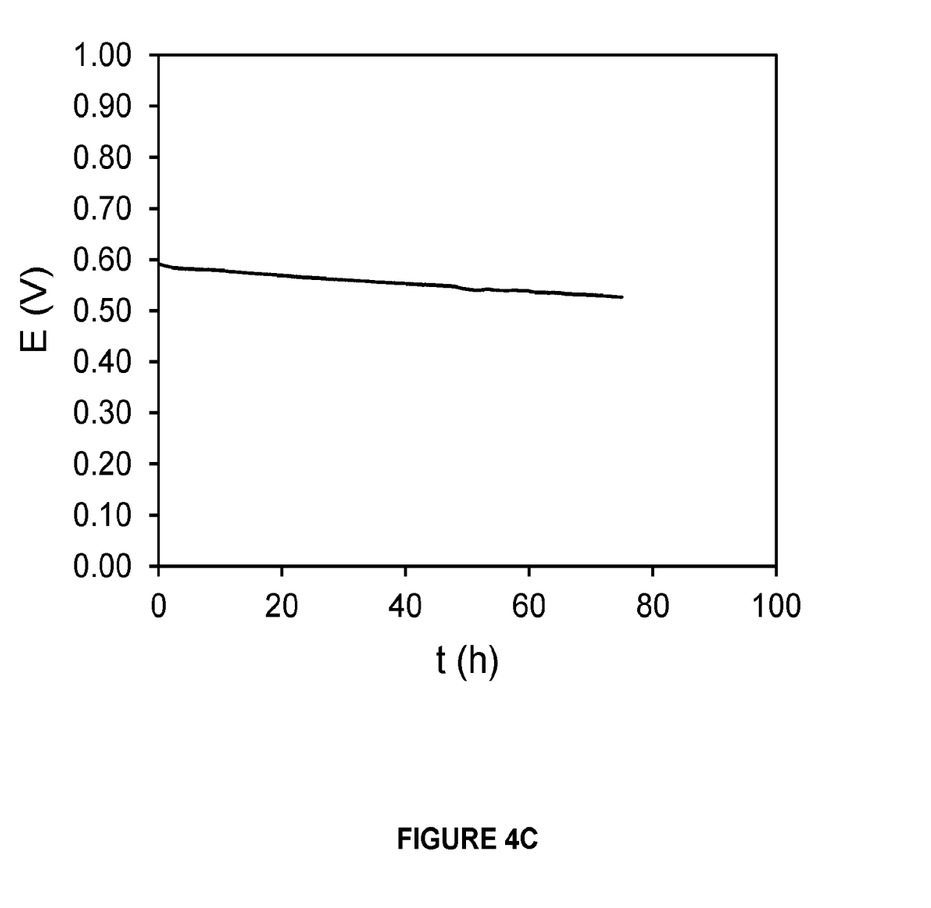

In one embodiment, an In-doped $SnP_2O_7$ membrane with higher proton conductivity (0.09 S $cm^{-1}$ at 225° C.) was prepared as shown in FIG. 4a. The open circuit voltage (OCV) of the single cell performance is about 0.88 V at 225° C., which is a slightly lower than that (0.95-1.0 V) measured in a button cell, but in good agreement with that measured in a planar cell. In a further embodiment, it may be improved by completely removing the pores in the membrane and reducing the internal leakage of the planar cell testing fixture in the future. The power density curve in FIG. 4b shows a peak powder density of 80 m W $cm^{-2}$, and may also be improved by increasing the OCV and optimizing the catalyst layers, such as by using intermediate catalyst layers and higher Pt loadings [3]. The fuel cell also exhibited steady running at a constant current density of 100 mA $cm^{-2}$ for about 80 h at a degradation rate of 0.9 mV $h^{-1}$, as shown in FIG. 4c. The slight decrease of performance may be caused by the degradation of the membrane and the catalyst (Pt/C), especially at the cathode. Such embodiments provided herein may provide methods for the effective commercialization of IT-FCs.

Sintering causes a severe drop of proton conductivity due to the decomposition of $SnP_2O_7$ and release of residual fused phosphoric acid and/or phosphorous oxides in the $SnP_2O_7$ membranes. Herein, in some embodiments are disclosed a route to restore the proton conductivity by introducing $H_3PO_4$ inside a sintered $SnP_2O_7$ membrane to react with the degraded $SnP_2O_7$ for restoration. After restoration, the $SnO_2$ produced from the decomposition of $SnP_2O_7$ is converted back to $SnP_2O_7$, and fused phosphoric acid and/or phosphorous oxides (17.7-20.0%) are regenerated in the restored $SnP_2O_7$ membranes. The proton conductivity was enhanced from $9.7\times10^{-4}$ S $cm^{-1}$ to 0.061 S $cm^{-1}$ at 225° C. with gases humidified at 30° C. This approach makes it possible to prepare an applicable large membrane with high proton conductivity and mechanical strength as the electrolyte of IT-FCs at a large scale. It can also be applied to other inorganic solid electrolytes of IT-FCs.

Example 3

In some embodiments $Sn_{0.9}In_{0.1}P_2O_7$ was prepared by the reaction of $H_3PO_4$, tin dioxide ($SnO_2$, 99.9%, Afla Aesar)

and indium (III) oxide ($In_2O_3$, 99.99%, Afla Aesar) [1, 2]. 25.30 g $H_3PO_4$ (85.6%, ACS reagent, J. T. Baker) was diluted in about 11.30 g deionized water in a beaker and then 1.23 g $In_2O_3$ and 12.00 g $SnO_2$ were dispersed in the solution in sequence. The slurry was stirred at ca. 110° C. overnight (covered by a Teflon sheet), at about 220° C. for 1 h, and lastly at about 250° C. until hard to stir. The paste was calcined at 650° C. for 3 h to finally obtain $Sn_{0.9}In_{0.1}P_2O_7$. The as-synthesized $Sn_{0.9}In_{0.1}P_2O_7$ was then dry ball-milled (agate balls and jar, SPEX 8000M Mixer/Mill) for 20 min. The obtained powders (10.5 g) were then mixed with deionized water (3.0 g) at a mass ratio of 3.5:1. The mixture was wet ball-milled (HDPE bottle, agate balls, SPEX 8000M Mixer/Mill) for 10 min. The gained slurry was then casted in a mold ($\phi$=25 mm) at room temperature to form a membrane, which was further heated in a tube furnace at a ramp rate of 5° C. $min^{-1}$ to 1050° C. for 25 h for sintering to get a sintered $Sn_{0.9}In_{0.1}P_2O_7$ membrane. To restore the proton conductivity, the sintered membrane was immersed into $H_3PO_4$ (85.6%), heated at ca. 110° C. overnight and subsequently at ca. 180° C. for 3 h. It was then heated in a tube furnace at 500° C. for 3 h. The process and membrane are denoted as restoration process and restored $Sn_{0.9}In_{0.1}P_2O_7$ membrane, respectively. Therefore is some embodiments disclosed herein a restored $Sn_{0.9}In_{0.1}P_2O_7$ membrane may be generated without the introduction into the membrane of starch grains to form pores, and the subsequent burning off the starch during the sintering process to form such pores in the membrane. In such embodiments the lattice structure of the $Sn_{0.9}In_{0.1}P_2O_7$ membrane allows for the penetration of the $H_3PO_4$ into the membrane to allow restoration of the degraded pyrophosphate species. In another embodiment, $Sn_{0.9}In_{0.1}P_2O_7$ was synthesized by the reaction of $H_3PO_4$, tin dioxide ($SnO_2$) and indium (III) oxide ($In_2O_3$). The casted $Sn_{0.9}In_{0.1}P_2O_7$ membrane was sintered at 1050° C. for 25 h to enhance mechanical strength. The XRD pattern of the sintered $Sn_{0.9}In_{0.1}P_2O_7$ membrane in FIG. 4b shows, (as compared with that of the as-prepared $Sn_{0.9}In_{0.1}P_2O_7$ in FIG. 4a) no occurrence of new reflections, indicating that the sintering conditions does not cause the decomposition of $Sn_{0.9}In_{0.1}P_2O_7$.

The above disclosure is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of restoring proton conductivity to a sintered pyrophosphate membrane, comprising:
    adding a phosphoric acid to the sintered pyrophosphate membrane, wherein said membrane comprises a pyrophosphate-decomposition product;
    reacting the phosphoric acid, and pyrophosphate-decomposition product to form a regenerated-pyrophosphate species; and
    restoring the proton conductivity of the sintered pyrophosphate membrane comprising the regenerated-pyrophosphate species, wherein the proton conductivity is at least equivalent to the proton conductivity of a non-sintered pyrophosphate membrane.

2. The method of claim 1, wherein pyrophosphate-decomposition product comprises $SnO_2$.

3. The method of claim 1, wherein said restored proton conductivity of said sintered membrane is about 0.061 S cm-1 at 225° C.

4. A method of making a restored sintered pyrophosphate membrane reacting $H_3PO_4$ and $SnO_2$ in deionized water to form a paste;
    calcinating said paste to form an $SnP_2O_7$;
    dry ball-milling said $SnP_2O_7$ to form a powder;
    mixing said powder and deionized water, and milling to form a slurry;
    casting said slurry in a mold,
    sintering said mold; and forming a sintered pyrophosphate membrane wherein said membrane comprises a pyrophosphate-decomposition product;
    placing said sintered pyrophosphate membrane into $H_3PO_4$ and heating to form a restored pyrophosphate membrane, wherein said membrane comprises a proton conductivity at least equivalent to a pyrophosphate membrane that is non-sintered.

5. The method of claim 4, wherein said mixing further comprises adding corn starch to said powder and deionized water, and milling to form said slurry.

6. The method of claim 5, wherein sintering said mold further comprises removing said corn starch and forming a porous sintered pyrophosphate membrane wherein said membrane comprises pores and pyrophosphate-decomposition product.

7. The method of claim 6, wherein said removing is by burning.

* * * * *